No. 659,426. Patented Oct. 9, 1900.
A. A. WILLIAMS.
GAS ENGINE.
(Application filed Dec. 1, 1899.)
(No Model.) 5 Sheets—Sheet 3.
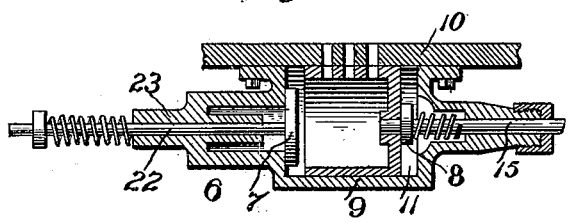
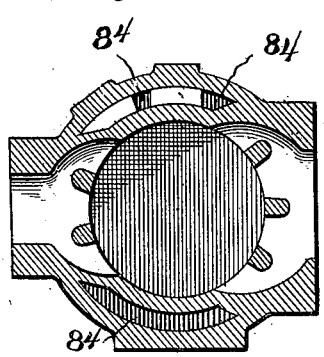
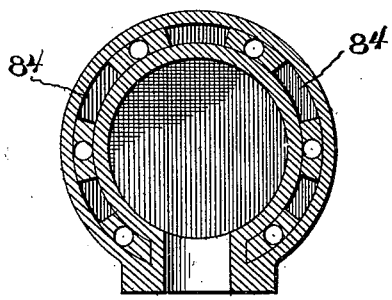
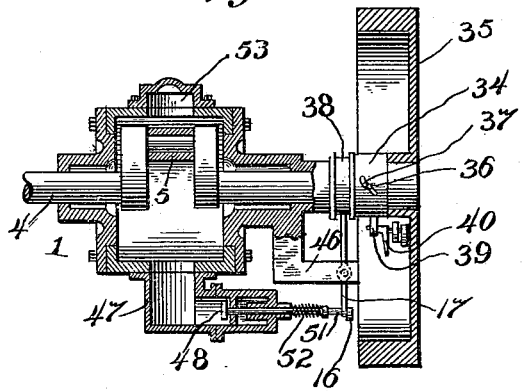
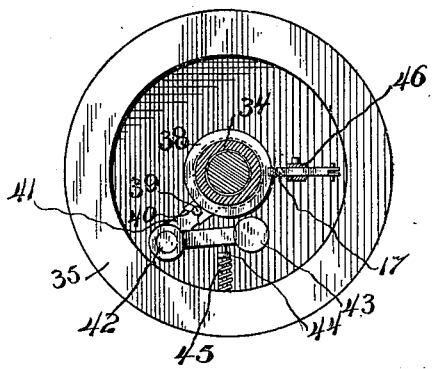
Inventor
Adolph A. Williams
Witnesses
Geo. P. Kingsbury
F. S. Belt No. 659,426. Patented Oct. 9, 1900.
A. A. WILLIAMS.
GAS ENGINE.
(Application filed Dec. 1, 1899.)
(No Model.) 5 Sheets—Sheet 4.

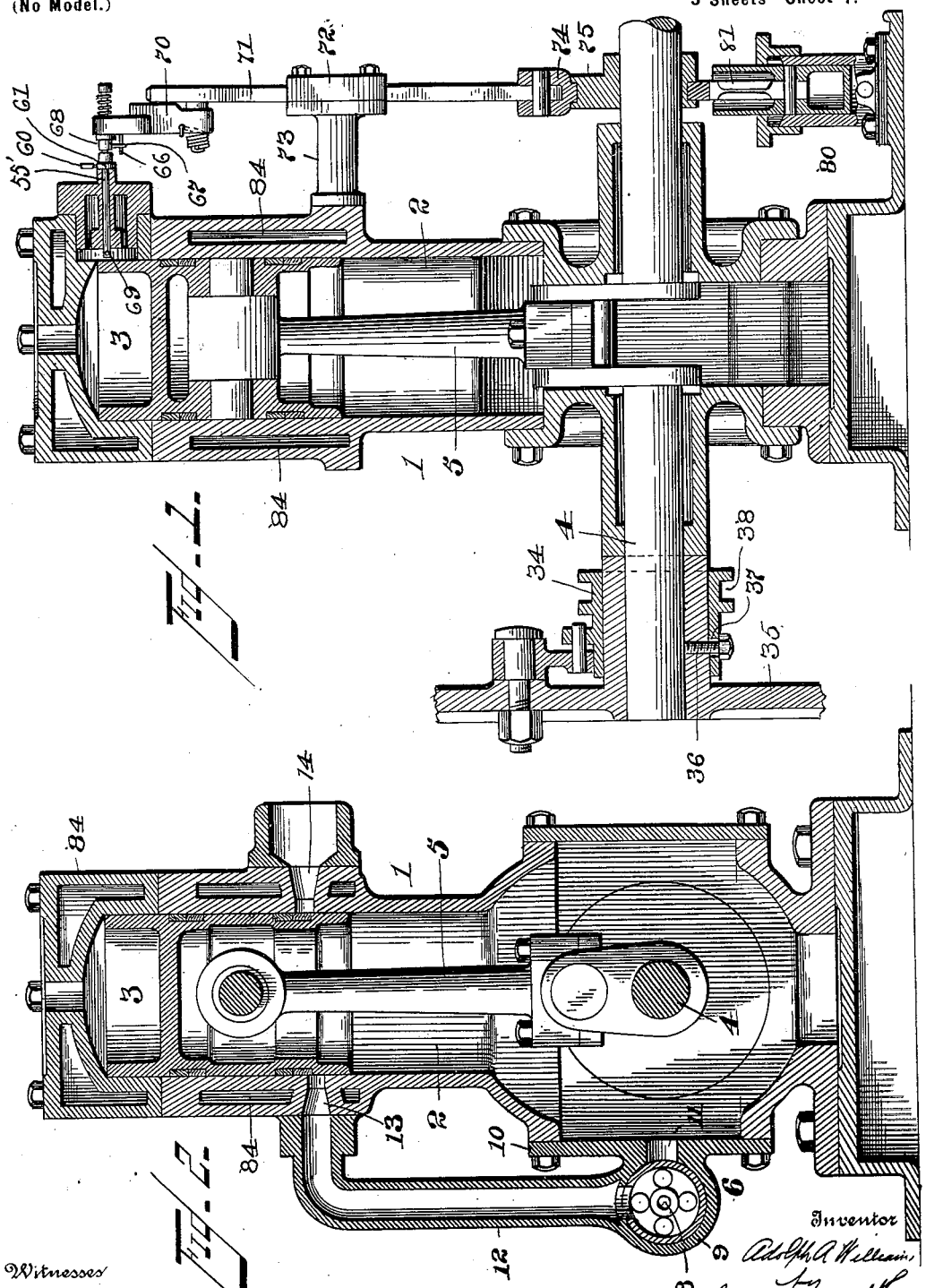

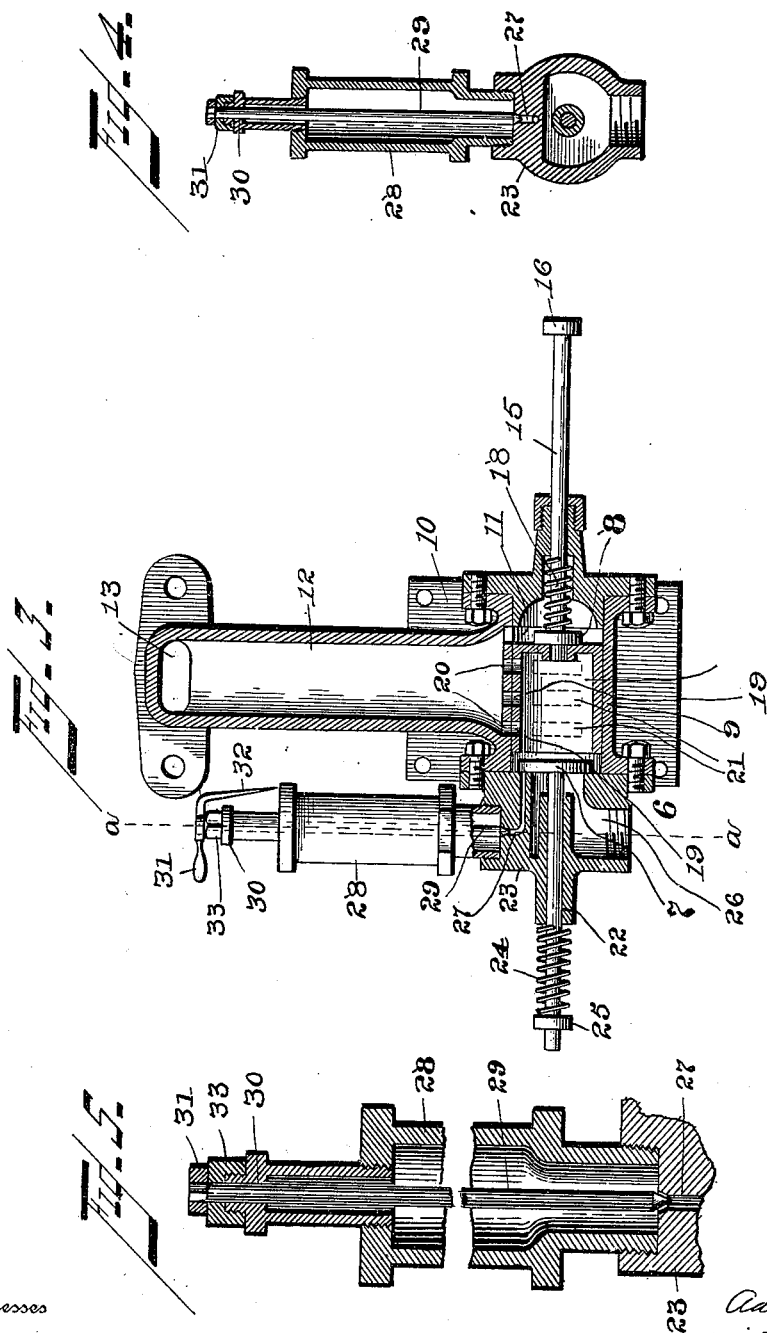

Witnesses
Fenton S. Belt,
Allan W. Fuss.

Inventor
Adolph A. Williams
by
his Attorneys

THE NORRIS PETERS CO., PHOTO-LITHO., WASHINGTON, D. C.

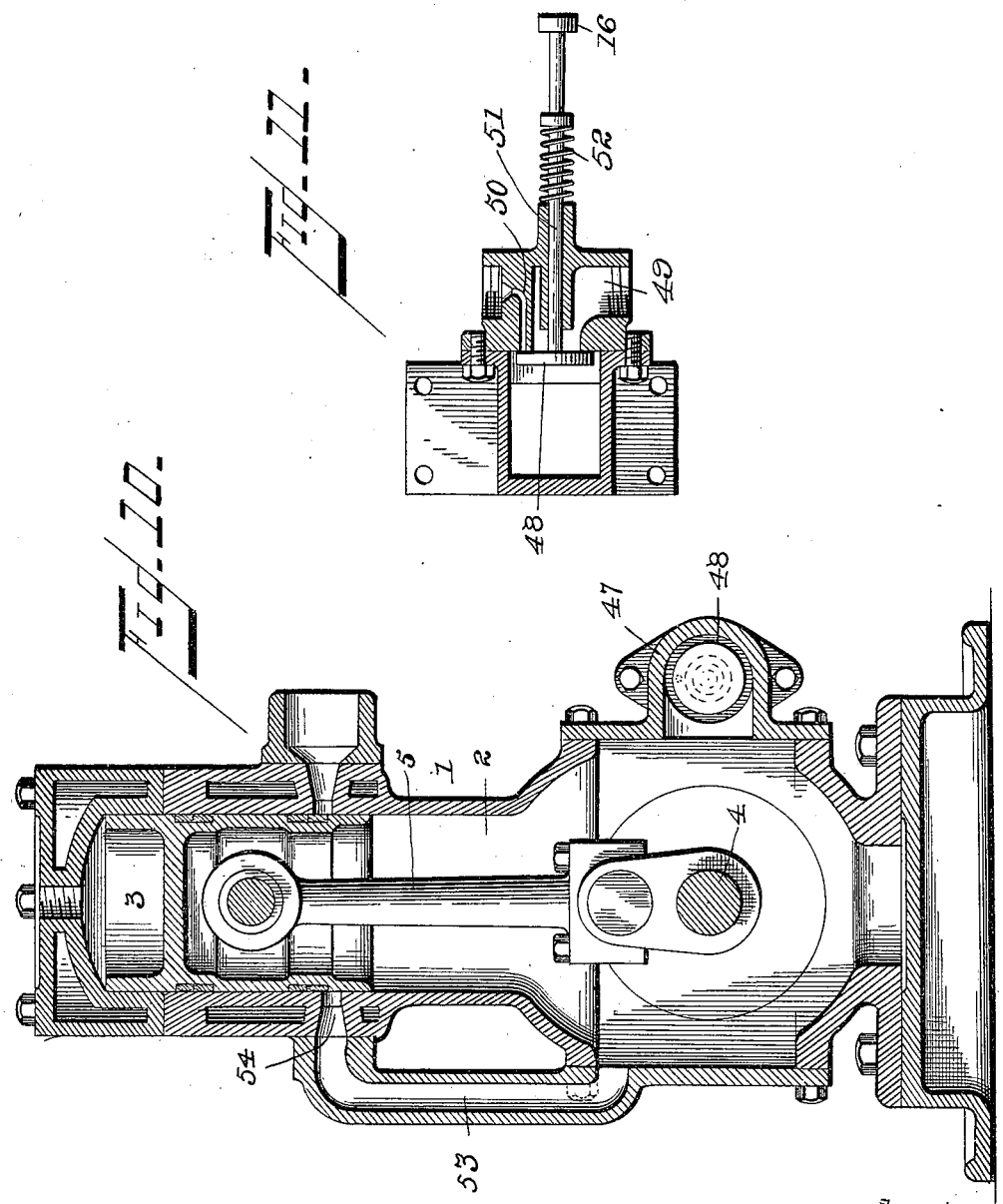

UNITED STATES PATENT OFFICE.

ADOLPH A. WILLIAMS, OF SUPERIOR, WISCONSIN.

GAS-ENGINE.

SPECIFICATION forming part of Letters Patent No. 659,426, dated October 9, 1900.

Application filed December 1, 1899. Serial No. 738,883. (No model.)

*To all whom it may concern:*

Be it known that I, ADOLPH A. WILLIAMS, a citizen of the United States, residing at Superior, in the county of Douglas and State of Wisconsin, have invented certain new and useful Improvements in Gas-Engines; and I do hereby declare the following to be a full, clear, and exact description of the invention, such as will enable others skilled in the art to which it appertains to make and use the same.

My invention relates to improvements in gas-engines; and it consists in an engine having a suitable cylinder, a power-shaft and pistons for operating the same, feed-valve mechanism for regulating the supply of gaseous mixture for operating the piston, and a governor upon the shaft of the engine and mounted upon a fly-wheel, said governor being connected with the feed-valve mechanism to control the amount of explosive mixture introduced into the engine.

It also consists in a gas-engine having a suitable cylinder and piston, means for introducing explosive mixtures into the said cylinder, a power-shaft operated by the said piston, an eccentric carried by the said shaft, said eccentric being attached to a pump upon one side of the said shaft and to a lever upon the other side of the shaft, and igniting apparatus adapted to be engaged by the said lever, the construction being such that upon the revolution of the shaft the pump will be operated and at the same time the igniting devices will be actuated.

It also consists in certain other novel constructions, combinations, and arrangements of parts, as will be hereinafter fully described and claimed.

Figure 9:
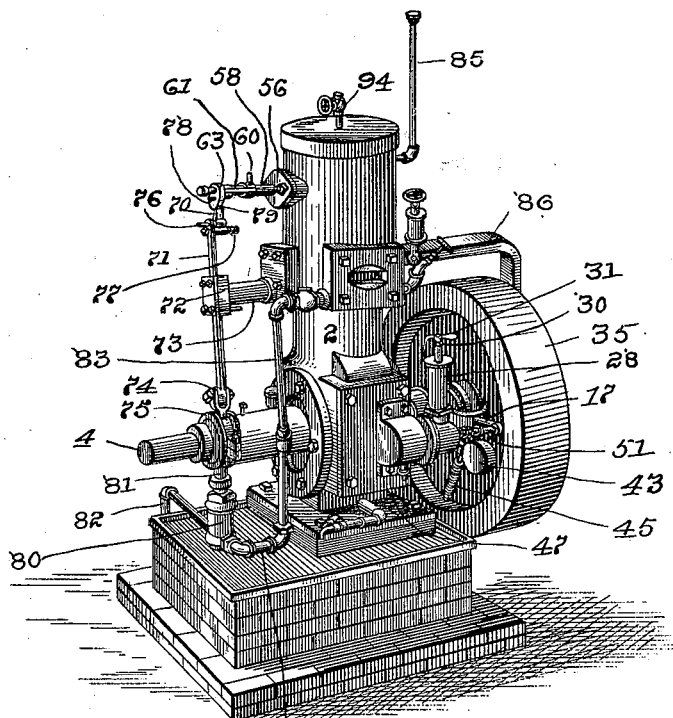
Figure 14:
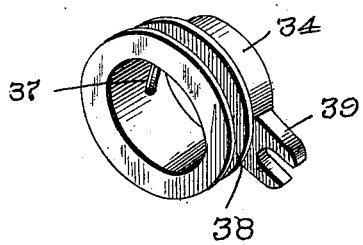
Figure 15:
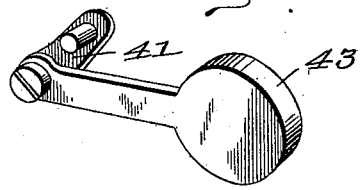
Figure 16:
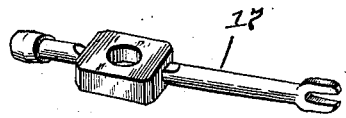

In the accompanying drawings, Figure 1 represents a vertical longitudinal section through an engine constructed in accordance with my invention. Fig. 2 represents a vertical transverse section through the same. Fig. 3 represents a vertical section through the supply-valve mechanism. Fig. 4 represents a detail vertical section on the line *a a* of Fig. 3. Fig. 5 represents a detail sectional view of an oil-valve. Fig. 6 represents a detail horizontal section through the said supply-valve mechanism. Fig. 7 represents a horizontal section through the cylinder of the engine upon a line with the inlet and exhaust ports. Fig. 8 represents a similar horizontal section through the cap of the cylinder. Fig. 9 represents a perspective view of the gas-engine, showing a little different arrangement of the supply-valve mechanism. Fig. 10 represents a vertical transverse section through the same. Fig. 11 represents a vertical detail sectional view through the supply-valve mechanism of this form of the invention. Fig. 12 represents a horizontal sectional view through the engine-casing, the supply-valve, and the governor mechanism. Fig. 13 represents a detail elevation of the governor mechanism. Figs. 14, 15, and 16 represent detail perspective views of portions of the governor mechanism.

1 in the drawings represents the gas-engine; 2, a cylinder; 3, a piston moving therein; 4, a crank-shaft operated by the said piston by means of a pitman, as 5.

My improved gas-engine is so constructed that the movement of the piston will draw into the casing of the engine a charge of explosive mixture and force the same through a suitable port into the end of the cylinder, where it is to be ignited. For this purpose the engine is provided with a suitable supply-valve mechanism, which is preferably arranged upon the engine-casing at a point about opposite the crank or power shaft. The supply-valve mechanism 6 comprises an inlet-valve 7 and a governor-valve 8. The governor-valve 8 is preferably mounted in a casing, as 9, secured to one of the inclosing plates, as 10, of the crank-chamber in the engine-casing. This casing is provided with a port, as 11, which leads directly into the engine-casing. The casing 9 is preferably bored cylindrically to receive the cylindrical valve 8. The casing 9 is also provided with a pipe extension, as 12, leading to an inlet-port 13, which permits the introduction of the gaseous mixture into the cylinder of the engine. This pipe extends upwardly and is bent at right angles at its upper end, so as to enter the cylinder 2 about midway of its length. When the piston 3 is at or near the lower end of its stroke, the inlet-port 13 is uncovered and a charge of gas and air or other explosive mixture can be introduced into the cylinder at that time. Arranged oppositely to the inlet-port 13 is an exhaust-port 14, which is also uncovered when the piston is at the lower end of its stroke.

The inlet-valve mechanism and the governor-valve mechanism form important features of my invention. The governor-valve 8 is preferably cylindrical and reciprocates in the casing 9, it being provided with a valve-stem, as 15, which projects through a suitable packing-gland, the outer end of the said stem being provided with a head, as 16, which is adapted to be engaged by a lever 17 of the governor. The head 16 is normally held against the said governor-lever by means of a spring 18, interposed between the packing-gland and the end of the governor-valve 8, which spring 18 may, however, be omitted, if desired. The governor controls the entrance of the explosive mixture into the inlet-pipe 12 and is provided upon its upper surface with a series of ports 19 19, which coincide with similar ports 20, arranged in the casing at the bottom of the tube or pipe 12. The governor-valve 8 is also provided upon its side with a series of ports, as 21, which coincide with the ports leading into the casing of the engine. It will be seen that if the engine moves too rapidly the governor will close the valve partially or entirely close the ports of the inlet-pipe 12, so that a smaller charge of explosive mixture or no charge at all will be admitted to said pipe. The feed-valve proper, 7, is located in the end of the casing 9 of the governor-valve and is provided with a stem 22, which finds suitable bearing in the casing or cap 23, which is bolted or riveted to the end of the casing 9, so as to close the same. The stem 22 and the valve 7 carried thereby are normally held in their outer positions by means of a coil-spring 24, interposed between the casing 23 and a nut or head 25, applied to the end of the stem 22. The casing 23 has an inlet-opening, as 26, preferably upon its under side and leading to the valve 6 for the admission of air to the casing 9. A smaller passage, as 27, is also formed in the said casing and adapted to be closed by the valve 7 at one end, while the other end opens into the bottom of an oil-reservoir, as 28, and is provided with a valve-seat which is engaged by a needle-valve, as 29, mounted in the said reservoir. The reservoir 28 is made of suitable size to hold a proper fuel-oil, and the inlet-valve 29 regulates the flow of oil to produce the proper mixture with the incoming air. The spring 24 holds the valve 7 normally seated against the casing 23, so as to close the air-inlet port and oil-inlet port. When the piston in the engine rises, however, it produces a sufficient suction to draw the proper supply of air and oil through the governor-valve and the inlet pipe and port into the cylinder ready for the igniting-spark. The needle-valve 29 is preferably held in suitable bearing at its upper end, as at 30. A handle, as 31, is applied to the upper end of the needle-valve, said handle being provided with a pointer or indicator, as 32, which operates in connection with suitable marks or a dial, so as to show the amount of oil let in when the valve is in its different positions. A nut 33 at the upper end of the reservoir holds the packing in place around the upper end of the needle-valve. The needle-valve can be properly adjusted to admit the necessary amount of oil for producing the gaseous explosive mixture for operating the engine.

The operation of the inlet-valve mechanism and the governor-valve mechanism is as follows: When the piston ascends, the suction produced in the engine-casing causes air and oil to be drawn inwardly past the valve 7 and through the ports 21 21 of the governor-valve into the engine-casing, where oil and air become thoroughly mixed. When the piston again descends, it forces the mixture thus produced back into the governor-valve through the ports 21 and out through the ports 19 and 20 into the pipe 12, when it is directed through the inlet-port 13 into the cylinder 2 above the piston 3. The piston upon rising again compresses the charge of explosive gas and air into the upper end of the cylinder, when it is ignited for forcing the cylinder downwardly. The operation is thus repeated as just described for drawing in and using the next charge of explosive mixture. The governor-valve, it will thus be seen, has complete control over the amount of explosive mixture introduced into the engine and will therefore regulate the said feed or supply according to the speed of the engine. In order to accomplish this controlling of the valve, the governor mechanism comprises a movable sleeve, as 34, loosely mounted upon the hub of the fly-wheel 35. A pin, as 36, upon the said head engages a diagonal slot 37 in the collar 34. An annular groove 38 upon the periphery of the said collar engages the end of the lever 17 for moving it one way or the other, according to the speed of the engine. The collar 34 is also provided with a bifurcated extension or lug, as 39, which engages a wrist-pin 40 upon a bell-crank lever 41. The bell-crank lever 41 is pivoted to the web of the fly-wheel 35, as at 42, the said bell-crank being formed with a suitable weight, as 43, upon one end. The weighted end of the lever 41 is adjusted by means of a nut 44, which bears against a spring 45. The spring 45 is held in place by a pin extending inwardly from the rim of the fly-wheel and a pin extending outwardly from one arm of the bell-crank lever 41, said latter pin carrying the nut 44. By means of this spring and nut the power of the weight 43 to throw the valve mechanism can be increased or diminished. The lever 17 is preferably pivoted to an arm 46, formed upon the extension of the engine-casing. The outer end of the lever 17 is bifurcated, so as to fit around the valve-stem 15, said bifurcated end engaging the head 16 of the said valve-stem, as heretofore mentioned. It will be seen that when the revolution of the fly-wheel becomes excessive the weight 43 will be thrown outwardly to a greater distance than when the engine is running at its normal speed. The bell-crank lever thus actuated will rotate the collar 44 against the pin 36, and the diagonal slot 37 will thus cause the collar to be moved endwise upon the hub of the fly-wheel and will move the lever 17, and thereby the governor-valve, to partially or entirely close the inlet-ports.

As seen in Figs. 11, 12, 13, and 14, the inlet-valve proper may be used also as a controlling or governor valve, the hollow cylindrical valve 8 in this instance being dispensed with. In this arrangement the inlet to the casing is arranged upon one side thereof and covered by a valve-casing, as 47, and the valve 48 is mounted in a similar manner to the valve 8, so as to control an air-inlet port, as 49, and an oil or vapor outlet port, as 50, while the stem of the said valve engages suitable bearings in the casing. The outer end of the stem 51 of the said valve is connected with the governor mechanism in the same manner as the stem 15, above described. The valve 48 will thus be permitted to open under the influences of the suction of the piston to a greater or less extent, according to the speed of the engine. A spring, as 52, upon the valve-stem 51 is interposed between the shoulder formed thereon and the casing supporting the valve to normally hold the valve upon its seat. When the valve 48 is employed, the gaseous mixture, which is drawn into the casing, is preferably permitted to pass into the upper end of the cylinder through a pipe, as 53, arranged upon the opposite side of the casing from the said valve and leading the mixture to the inlet-port 54 at the side of the cylinder. It will be observed that this arrangement and construction will operate in practically the same manner as that above described, and the said construction is entirely within the scope of the present invention.

I contemplate using any suitable igniting mechanism in connection with my gas-engine for causing the explosions necessary for operating the piston therein.

From the above description it will be evident that by my improved mechanism a gas-engine may be properly supplied with explosive mixtures, the amount of the said supply being governed by the said governor mechanism.

The parts are simple and not likely to get out of order, and the engine can be kept under perfect control.

Having now described my invention, what I claim as new, and desire to secure by Letters Patent, is—

1. In a gas-engine, the combination with a suitable casing inclosing a piston and crank, of a supply-valve mechanism comprising an inlet-valve and a governor-valve, a governor for operating the said governor-valve, the structure being such that the piston will draw in air and gaseous vapor past the inlet-valve and force the same into the cylinder of the engine, and the governor-valve will control the amount of gaseous material drawn into the engine-casing and the amount forced therefrom into the cylinder, substantially as described.

2. In a gas-engine, the combination with a suitable casing inclosing a piston and crank, of a supply-valve mechanism comprising a casing mounted upon the engine-casing provided with ports leading into the said engine-casing, and into an inlet-tube, a reciprocating governor-valve having ports coinciding with the above-mentioned ports for regulating the inflow of the gaseous mixture, an inlet-valve covering an air-port and a gaseous-vapor port, a spring for normally holding the said valve upon its seat, a governor connected with the governor-valve, whereby a gaseous mixture may be drawn into the engine-casing and then be forced back through the governor-valve into the inlet-pipe and into the upper end of the engine-cylinder, substantially as described.

3. In a gas-engine, the combination with a suitable inclosing casing, of a supply-valve mechanism mounted thereon, an oil-reservoir connected with the said supply-valve mechanism, a valve for controlling the inlet from the oil-reservoir and controlling an air-inlet, a governor-valve also adapted to control the admission of the gaseous mixture to the engine-casing and the expulsion of the same therefrom as it is passed to the cylinder and a governor for operating the same, substantially as described.

4. In a gas-engine, the combination with a suitable casing of a supply-valve mechanism arranged thereon, an inlet-valve controlling the inlet-ports from an air-supply and a gas-supply, a reciprocating cylindrical valve for receiving the said charge a governor mechanism for reciprocating the said valve, said valve being provided with ports in its top and in its side portions, the casing being provided with coinciding ports, whereby the gas mixture may be drawn into the casing of the engine by the movement of the engine-piston and may be again forced from the said governor-valve into the upper end of the cylinder for operating the piston, substantially as described.

5. In a gas-engine, the combination with a suitable casing of a supply-valve mechanism mounted thereon comprising an inlet-valve and a governor-valve, an oil-reservoir for supplying the oil to the valve mechanism, said reservoir being provided with a needle-valve for regulating the amount of oil permitted to flow from said reservoir, a handle secured to the upper end of the needle-valve and provided with a pointer or indicator, said indicator moving over a dial, the construction being such that the needle-valve may be regulated to control the amount of gaseous material supplied to the explosive mixture, substantially as described.

6. In an engine, the combination with a suitable casing, of a supply-valve mechanism mounted thereon, a governor-valve mounted on said casing so as to control the amount of gaseous material passing into the casing and also to control the amount of said material which is permitted to pass from the casing into the engine-cylinder, a stem on said valve passing outwardly through a suitable packing, a governor mounted upon the fly-wheel of the engine, a lever connecting the governor-valve stem with the said governor, whereby the said governor-valve will be reciprocated, substantially as described.

In testimony whereof I hereunto affix my signature in presence of two witnesses.

ADOLPH A. WILLIAMS.

Witnesses:
 JAMES T. WATSON,
 MARIE E. WIESINGER.